July 6, 1954   E. J. CAREY ET AL   2,682,995
PRINTER AND INDICATOR UNIT
Filed Sept. 29, 1951   7 Sheets-Sheet 1

INVENTORS
EDWARD J. CAREY &
DESMOND R. HEARSUM
BY
THEIR ATTORNEYS

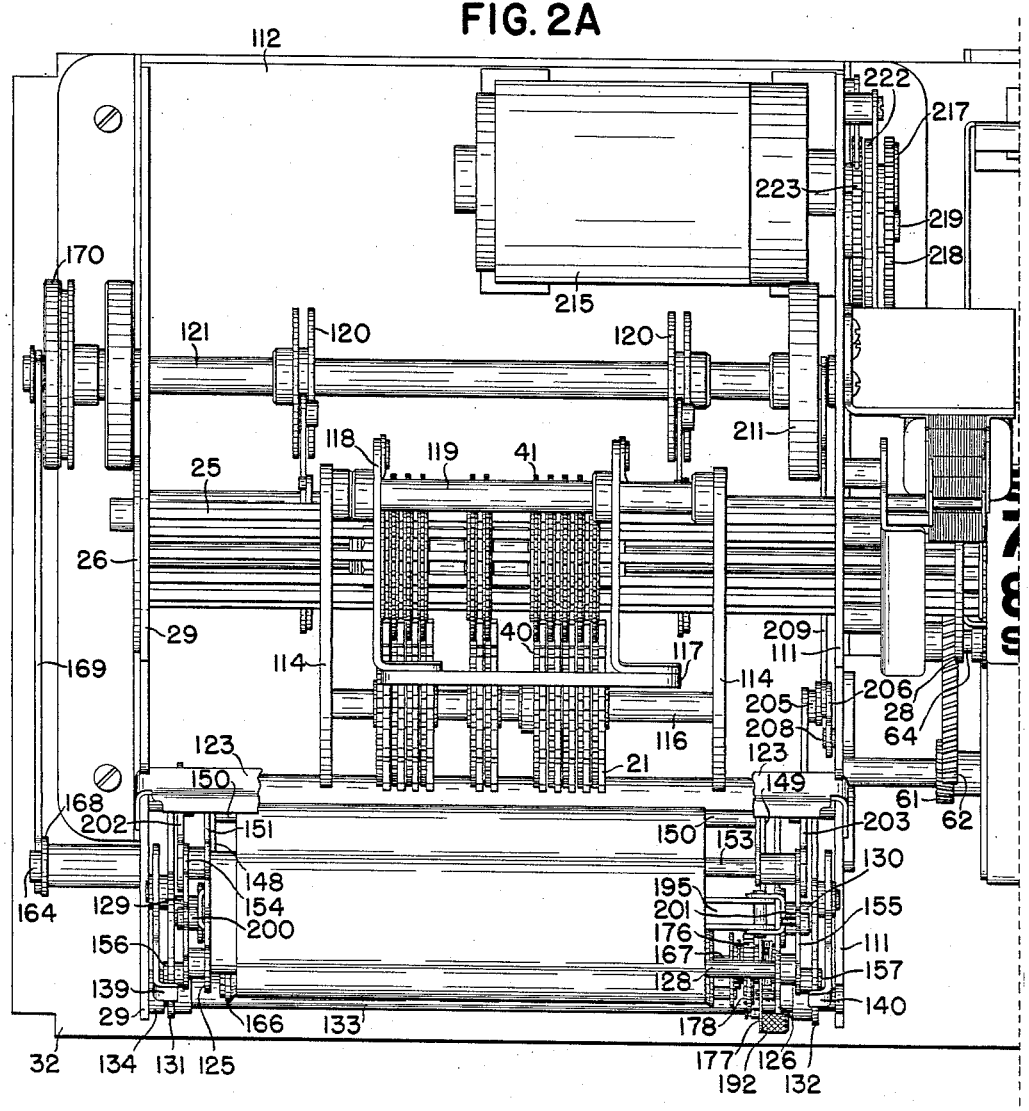

July 6, 1954 — E. J. CAREY ET AL — 2,682,995
PRINTER AND INDICATOR UNIT
Filed Sept. 29, 1951 — 7 Sheets-Sheet 3

INVENTORS
EDWARD J. CAREY &
DESMOND R. HEARSUM
BY
THEIR ATTORNEYS

July 6, 1954     E. J. CAREY ET AL     2,682,995
PRINTER AND INDICATOR UNIT

Filed Sept. 29, 1951     7 Sheets-Sheet 4

INVENTORS
EDWARD J. CAREY &
DESMOND R. HEARSUM
BY
THEIR ATTORNEYS

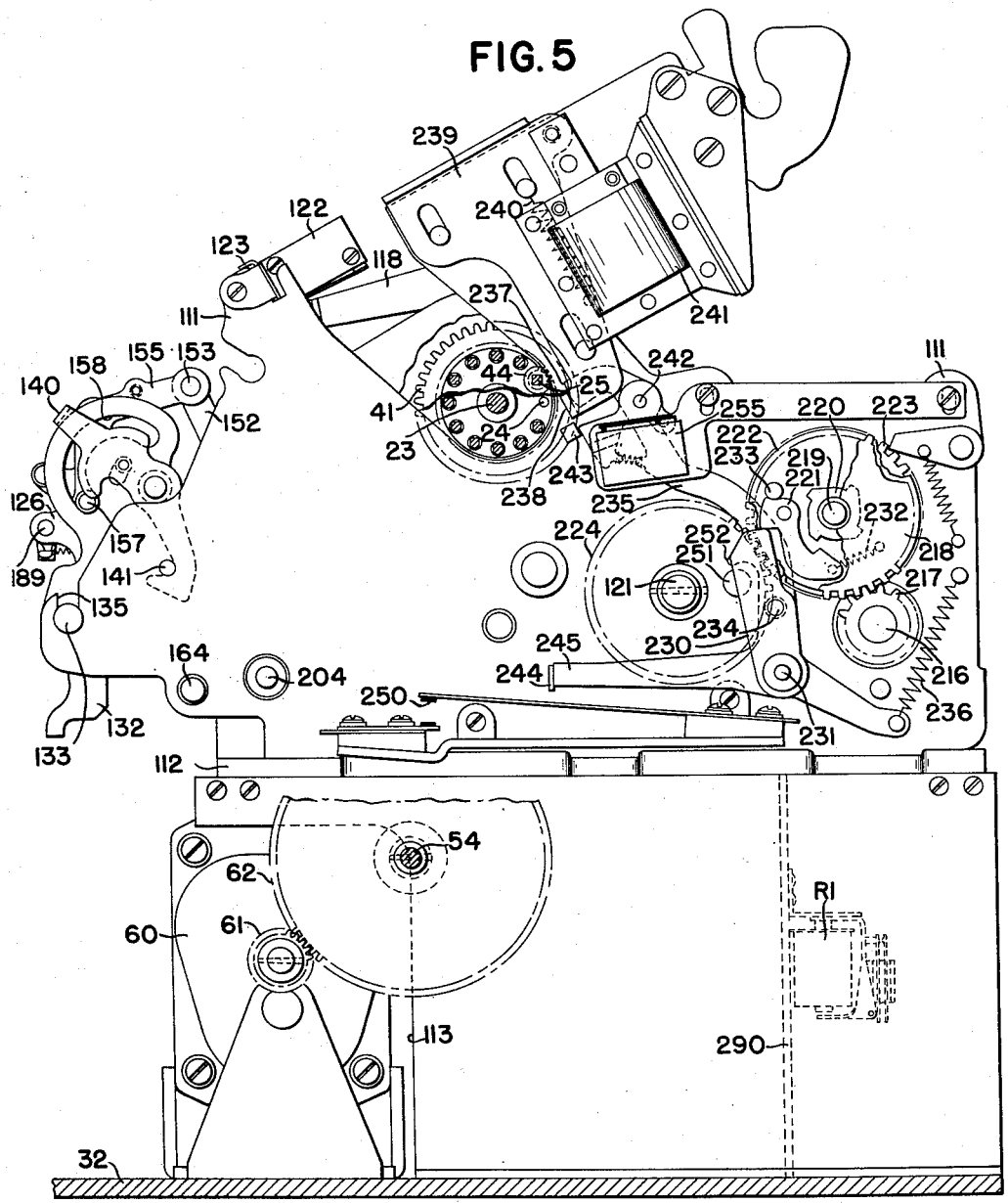

July 6, 1954   E. J. CAREY ET AL   2,682,995
PRINTER AND INDICATOR UNIT
Filed Sept. 29, 1951   7 Sheets-Sheet 6

INVENTORS
EDWARD J. CAREY &
DESMOND R. HEARSUM
BY
*Carl Bengt*
*Louis A. Kline*
THEIR ATTORNEYS Patented July 6, 1954

2,682,995

UNITED STATES PATENT OFFICE 2,682,995

PRINTER AND INDICATOR UNIT

Edward J. Carey, Oakwood, and Desmond R. Hearsum, Spring Valley, Ohio, assignors to The National Cash Register Company, Dayton, Ohio, a corporation of Maryland Application September 29, 1951, Serial No. 248,984

9 Claims. (Cl. 235—60.33)

This invention relates to a novel indicating and/or printing mechanism and particularly to a mechanism which is especially suitable for indicating and/or printing amounts standing on an electronic accumulator. The amount which is indicated and/or printed can also be stored in the novel mechanism for further use even after the accumulator has been cleared on this amount.

The amount standing on the accumulator is made available to the indicating and/or printing mechanism in the form of distinctive digit-representing potentials which can be sensed to control the indicating and/or printing of this amount.

The indicating mechanism includes a plurality of indicator drums, each of which is individually settable to indicate various ones of the digits of an amount, and the printing mechanism includes a corresponding plurality of type wheels, which are set along with the indicator drums to enable the indicated amount to be printed.

Each indicator drum and related type wheel is driven to the desired digit-representing position under control of a sensing means which senses a commutator to which a plurality of related potentials is applied, one of which is the distinctive digit-representing potential, and which causes the drive for the indicator drum and type wheel to be interrupted when the distinctive digit-representing potential is sensed. As soon as the sensing operation has been completed and the type wheels have been positioned according to the amount, means in the printing mechanism are operated to print the amount on a record strip and advance the strip.

The novel indicating and/or printing mechanism is intended for universal use to be controlled from various kinds of digit-representing potential supplies and is provided with convenient plug connections by which it may be readily connected to and disconnected from external controls and also sources of digit-representing potential supplies. Novel interlocking controls are provided to prevent an impression from being made from the type wheels while the type wheels are being set under control of the sensing means and also to prevent a sensing operation from taking place while an impression is being made on the record material.

It is an object of the invention to provide a novel indicating and/or printing mechanism which can be controlled according to data-representing potentials supplied thereto.

A further object of the invention is to provide a novel indicating and/or printing mechanism which can be controlled from an electronic accumulator to display and/or print the amount standing therein.

A further object of the invention is to provide a novel printing mechanism in which the printing operation is prevented while the type are being set and the type-setting operation is prevented while the printing operation takes place.

With these and incidental objects in view, the invention includes certain novel features of construction and combinations of parts, a preferred form or embodiment of which is hereinafter described with reference to the drawings which accompany and form a part of this specification.

Of the drawings:

Fig. 1 is a perspective view of the apparatus.

Figs. 2A and 2B together are a top plan view of the indicating and printing mechanism with the cabinet omitted and certain parts broken away to show the construction more clearly.

Fig. 5 is a section through the mechanism, showing in particular the right side frame of the printing mechanism and details of the drive for operating the printing mechanism in a printing operation.

GENERAL DESCRIPTION

The novel apparatus is arranged to indicate and/or print amounts which are presented thereto in the form of distinctive potentials. In the embodiment used to illustrate the invention, the distinctive potential will be the one that is more positive than others of a plurality of related potentials.

One source of such potentials may be an electronic accumulator of the type shown in the United States patent to Robert E. Mumma, No. 2,401,657, which issued on June 4, 1946. In this patent, each of the tubes of the bank corresponds to one of the digits of the notation and represents that digit when it conducts. The potential of the cathode of the conducting tube will be more positive than the potential of the cathodes of the other tubes of the bank and will provide the distinctive digit-representing potential.

After an entry has been made in the accumulator and the digit-representing potentials have become stabilized in the various denominational orders, a "Start" key is operated in the indicating and printing apparatus to initiate a read-out operation, followed by a printing operation. The potentials are sensed during the read-out operation, and indicator drums and type wheels are set according to the amount in the accumulator. At the conclusion of the read-out operation, an operation of the printing mechanism is initiated automatically to cause the amount to be printed on a record material and also cause the record material to be line-spaced. The details of the mechanism are as follows.

DETAILED DESCRIPTION

Figure 1:
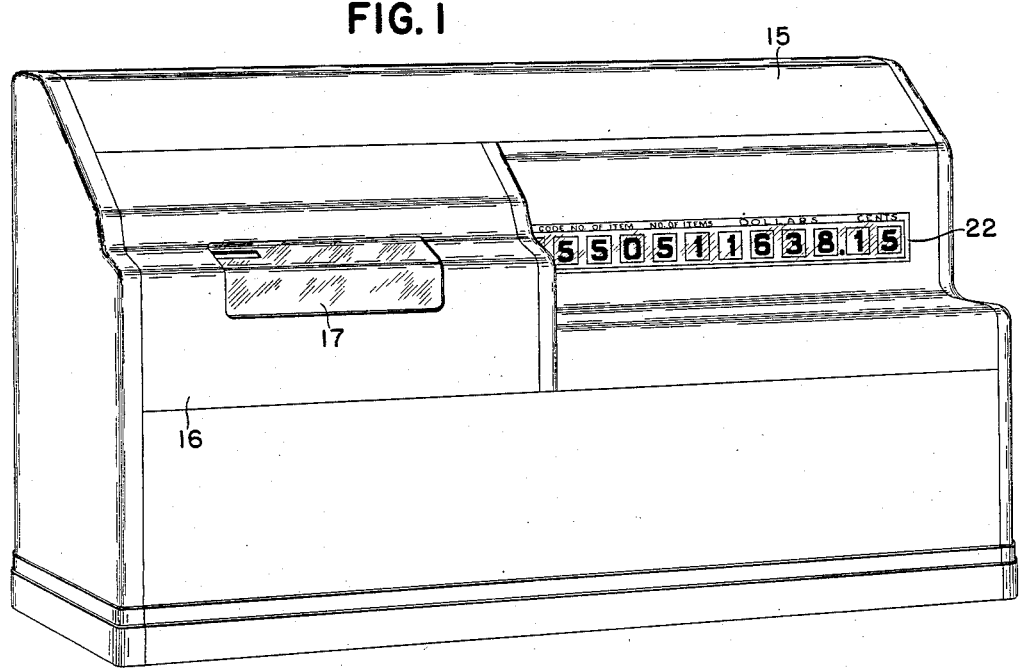
Figure 2B:
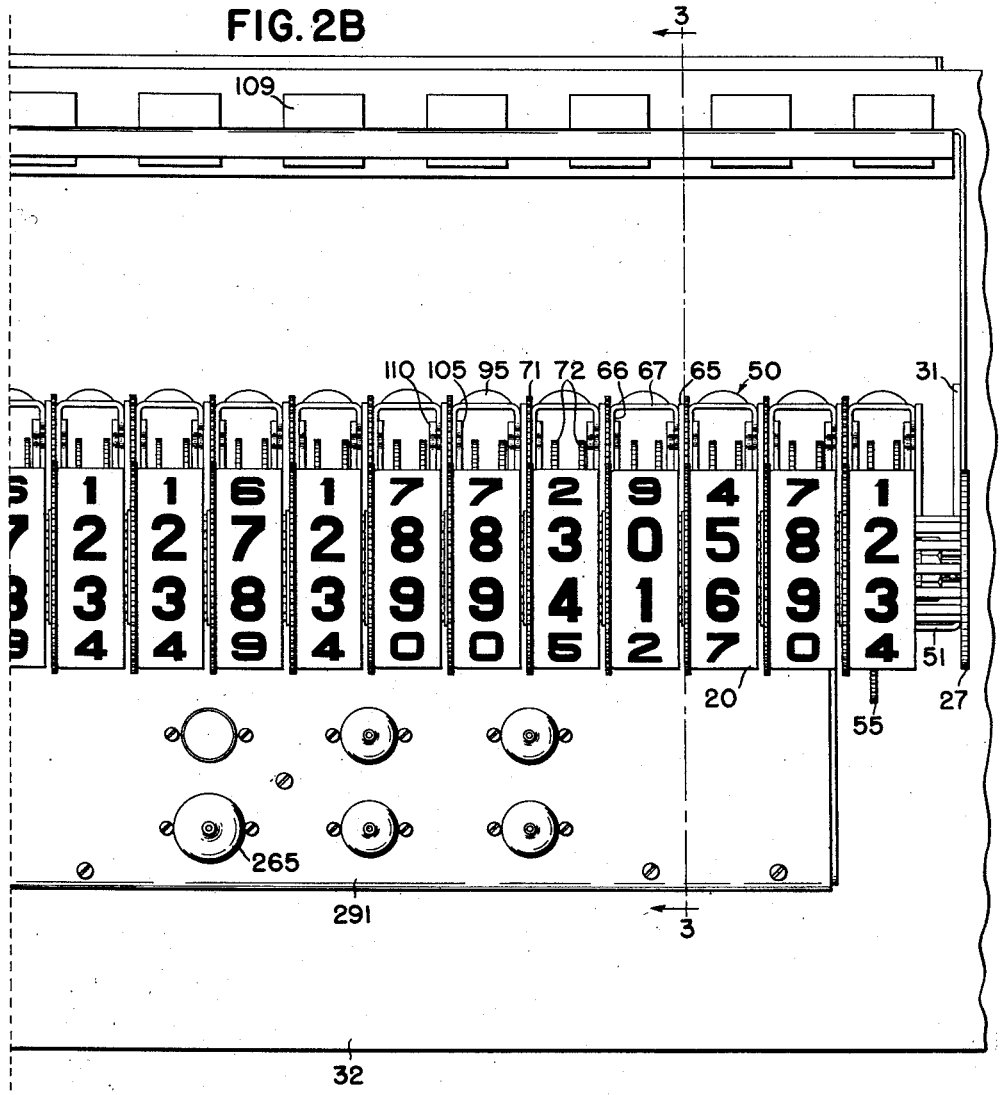

As shown in Figs. 1, 2A, and 2B, the novel apparatus has an indicator portion located at the right and a printer portion located at the left, both portions being coordinated in their operation to form a unitary device for providing a printed record of data and for indicating and storing data temporarily.

The cabinet 15 has a door 16 at the left to permit access to the printer portion to enable record material to be put into or removed from the apparatus as required. A transparent window 17 in the door enables the operator of the apparatus to watch the supply of record material to see that it is adequate and to replenish it when necessary. An opening in the window 17 enables notations to be written on the record material adjacent the printing thereon, if desired.

The cabinet 15 also has a window 22 at the right thereof, through which data can be read from the indicator portion of the apparatus. The data which can thus be read is that which was printed on the last operation of the apparatus and which is stored until a further indicating and printing operation of the apparatus to indicate and print new data takes place.

Indicator drums and type wheels

The novel apparatus is provided with a plurality of indicator drums 20 (Figs. 1, 2B, and 3) and a corresponding plurality of type wheels 21 (Figs. 2A, 6, and 9), each of the drums and type wheels being provided around its periphery with indicia according to the digits of the notation. As shown in Fig. 1 and also in the top plan view, Figs. 2A and 2B, the indicator drums are located in the right portion of the mechanism, and the type wheels are located in the left portion of the mechanism. In the case of the indicator drums, they can be rotated to bring the desired digit into viewing position opposite a window 22 in the cabinet 15 (Figs. 1 and 3), which encloses the mechanism; and, in the case of the type wheels, they are similarly rotated to bring the desired digit into printing position.

A system of gearing connects corresponding indicator drums 20 and type wheels 21 for simultaneous movement to various ones of their positions, so that a related indicating drum and type wheel will be set with the same digit in indicating and printing positions, respectively. This gearing, which is shown in Figs. 2A, 2B, 3, 5, and 6, includes a pair of supporting shafts 23 and 24 and a plurality of individually rotatable square transmission rods, as 25, which extend across the mechanism and are supported in end plates 26 and 27 and a central supporting plate 28. The end plate 26 is mounted on a left side frame 29 of the printer portion, the central supporting plate 28 is mounted on a left side frame 30 (Fig. 3) of the indicator portion, and the end plate 27 is mounted on a right side frame 31 of the indicator portion of the mechanism. There is one transmission rod 25 for each of the related indicator drums and type wheels, and the drum and the type wheel are coupled to their related rod for similar movement as follows:

The indicator drum 20 (Fig. 3) has secured thereto a gear 35, which has external teeth and internal teeth, the internal teeth of which engage the outside of a disk 36, carried by a sleeve 38, secured to the shaft 23. The disk 36 serves as a bearing for the gear 35 and for the transmission rods 25, which extend therethrough. Adjacent the rod 25 which is related to this particular drum, the disk 36 is recessed to receive a gear 37, which is mounted on the rod 25 to rotate therewith and is in alinement with the gear 35 and meshes with its internal teeth. Retaining plates of larger diameter than the disk are mounted on either side of the disk to keep the gears 35 and 37 in alinement.

Figure 3:
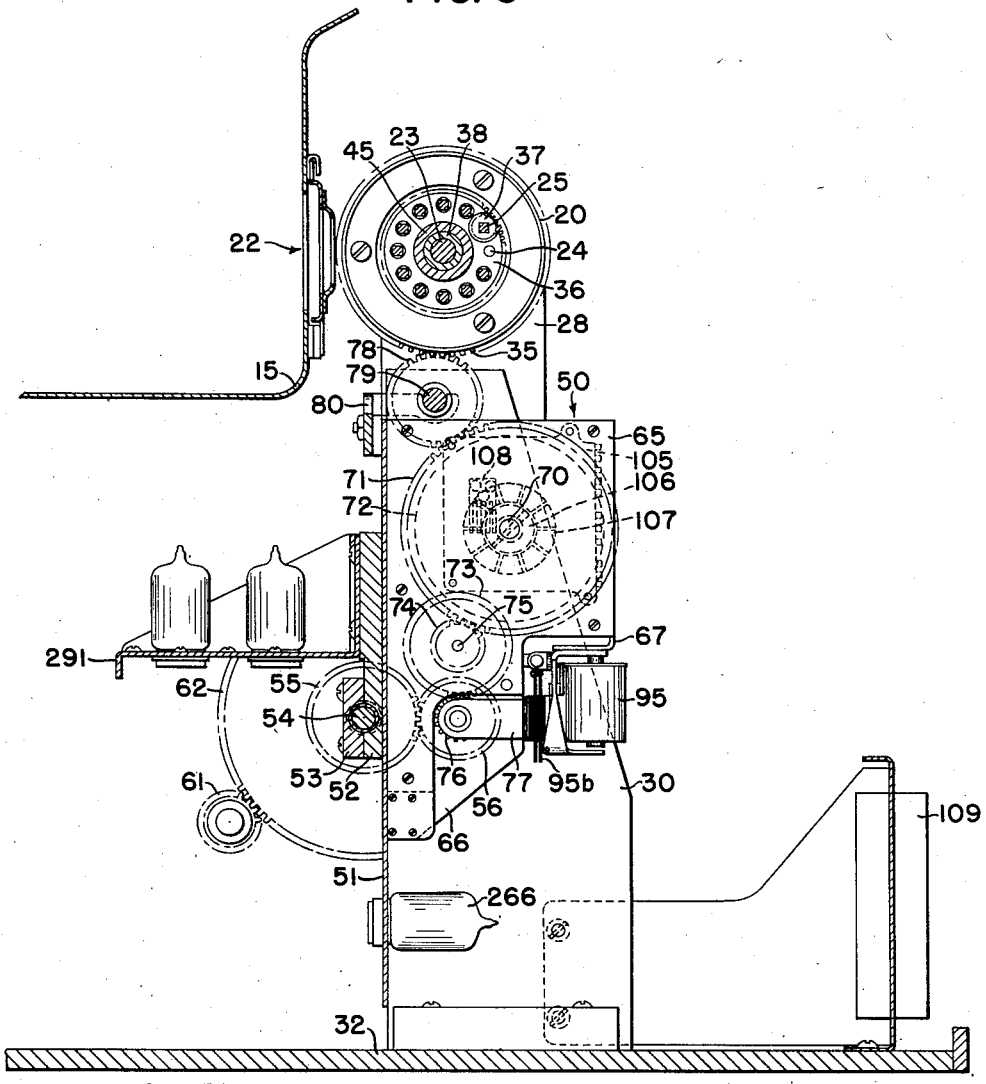
Fig. 3 is a vertical section through the indicating mechanism, showing the driving means and the controls for setting the indicator drum and type wheel.
Figure 6:
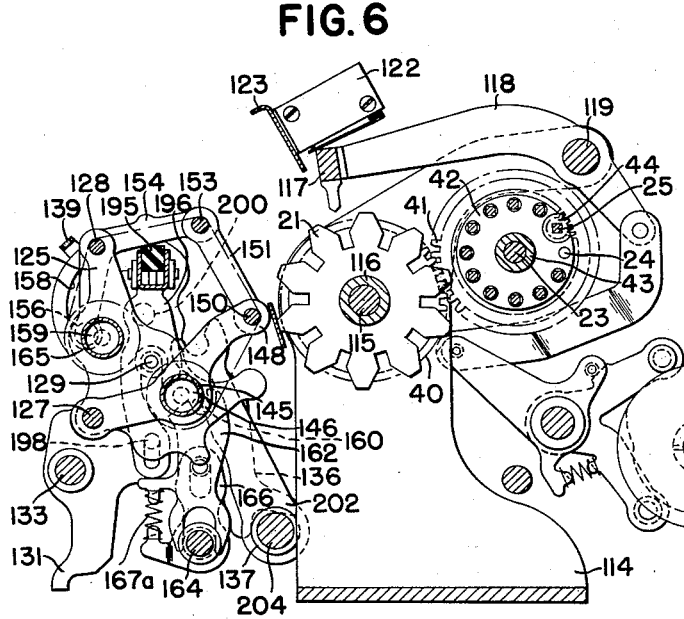
Fig. 6 is a section through the printing mechanism, showing the drive for the type wheels and also showing the platen and the record material supporting means in home position.

The type wheel 21 which is related to the drum shown in Fig. 3 is shown in Fig. 6. This type wheel has a gear 40, which meshes with the external teeth of an external-internal gear 41 similar to gear 35. The internal teeth of gear 41 gage a bearing disk 42, which is supported on a sleeve 43 on the shaft 23. The disk 42 is recessed to receive a gear 44, which is mounted on the transmission rod 25 in alinement with the gear 41 to mesh with the internal teeth thereof. Retaining disks on the sleeve 43 on either side of the bearing disk 42 retain the gears 41 and 44 in proper alinement.

The above train of gearing between the drum and its related type wheel, including gears 35 and 37 (Fig. 2), transmission rod 25 (Figs. 3 and 6), and gears 44, 41, and 40 (Fig. 6), connects the drum 20 and the type wheel 21 for corresponding movement. A similar train of gearing, utilizing different ones of the transmission rods, as 25, connects each of the other related drums and type wheels for corresponding movement.

The sleeves 38 and 43, upon which bearing disks as 36 and 42 are mounted, are provided with a shoulder at one end and are threaded at the other end. The disks are retained in proper spaced relation along the sleeve by being clamped between suitable spacers, as 45 (Fig. 3), when nuts are tightened on the threaded ends of the sleeves.

Sensing means and driving means

Sensing means and driving means are provided to position the various related indicator drums and type wheels during a read-out operation according to the amount standing on the accumulator. The sensing means and driving means are contained in a unit, as 50, for each of the related indicator drums and type wheels, the units being mounted side by side and secured to a front supporting plate 51 in the indicator portion of the mechanism as shown in Figs 2B and 3.

Since all the units, as 50, are of the same construction, their operation will be clear from the following description of one of them. The unit is constructed and operates substantially the same as the one which forms the subject matter of the United States patent application of Jack I. Kern, Serial No. 157,603, which was filed on April 22, 1950, and which issued on November 11, 1952, as Patent No. 2,617,870.

Each unit is self-contained within a pair of side walls 65 and 66 (Figs. 2B, 3, and 4), side wall 66 being bent over as at 67 (Figs. 2B and 4) to form suitable cross braces to which the side wall 65 can be secured in proper spaced relation. A shaft 70, journaled in the side walls 65 and 66, has a driving gear 71, secured to one end thereof, and has a pair of brush carriers 72 secured thereto. Gear 71 is connected through gears 73 and 74 to the output gear 76 of a single-revolution clutch carried by a bracket 77, secured to the side wall 66. The ratio between the gears 71, 73, 74, and 76 is such that gear 71 will make one tenth of a rotation for each rotation of gear 76. The gear 71 is connected through an intermediate gear 78 (Fig. 3) to the gear 35, which is attached to the indicator drum 20 and operates the gearing to the type wheel 21, and causes the drum and the type wheel to make one tenth of a revolution of movement to bring a different digit to indicating and printing position for each rotation of gear 76.

The intermediate gears 78 are rotatable on a shaft 79, which is mounted in the side frames 30 and 31 and supported intermediate its ends by a bracket 80, which is secured to the front frame 51.

Figure 4:
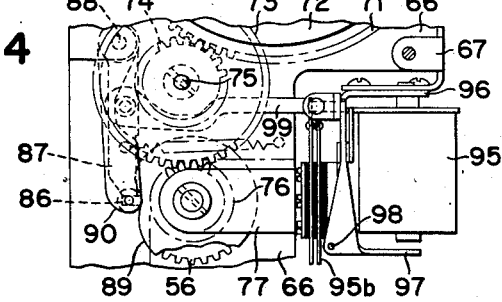
Fig. 4 is a detail view of the clutch in the driving means of Fig. 3 and the controls therefor.

The single-revolution clutch includes the input gear 56, which can be coupled to the output gear 76 by a spring-urged coupling means 86 (Fig. 4). A clutch trip lever 87 is pivoted on a stud 88 between the side walls 65 and 66 and normally is in position to engage the spring-urged coupling means 86 to hold it in uncoupling relation to uncouple the unit from its drive. A cam 89, secured to the output gear, is engaged by a spring-urged follower 90, pivoted on the stud 88, the follower cooperating with the cam to locate the driven portion of the clutch in its home position when the clutch-coupling means is disengaged.

The position of the clutch trip lever 87 is controlled by a clutch control magnet 95 (Figs. 2B, 3, and 4), which is mounted on a bracket 96, secured to an extension of the bent-over portion 67 of the side wall 66. An armature 97, pivoted at 93 on the bracket 96, has one end connected by a link 99 to the clutch trip lever 87. Resilient contacts 95b, which are normally closed, urge the armature clockwise (Figs. 3 and 4) to position the trip lever 87 in the path of the coupling means 86, where it will retain the clutch in its uncoupled condition. When the magnet 95 is energized, it will rock the armature 97 counterclockwise (Figs. 3 and 4) to move the clutch trip lever 87 out of engaging relation with the coupling means 86 to allow the clutch to couple the drive to the output gear 76, which drives the gear 71 and the brush carriers 72 connected thereto.

The supporting plate 51 has on its front side a bearing plate 52, which cooperates with other plates, as 53, to rotatably support a common drive shaft 54, which has secured thereto a plurality of driving gears 55, one for each unit, which extend through the plate 51 to engage an input gear 56 in each of the units.

A motor 60 (Fig. 5), located beneath the printer portion of the mechanism, is connected through gears 61 and 62 (Figs. 3 and 5) and drives the shaft 54 during a read-out operation. The control of the operation of the motor will be explained more fully hereinafter.

Secured to the inside of wall 66 of each unit is a commutator 105 (Figs. 2B and 3), which has a central collector ring 106 concentric with the shaft 70 and has ten segments 107 spaced equally about the collector ring.

A sensing brush 108, carried by one of the brush carriers 72, connects the segments 107 to the collector ring 106 one after another in succession as the carrier 72 rotates. Potentials are applied to the segments 107 over suitable connections (not shown in Fig. 3) from sockets 109, into which plug-in connections are made from the related order of the accumulator, and will cause the segment corresponding to the digit standing in the accumulator to be given a more positive potential than the rest. When the brush 108 engages a segment which does not have the distinctive potential applied thereto, it will be effective, through a circuit to be described more fully hereinafter, to cause the magnet 95 to be energized to trip the clutch, which, if the motor 60 is operating, will drive the brush to the next segment. As the brush engages each of the segments which does not have the distinctive potential applied thereto, the magnet 95 will be energized repeatedly to trip the clutch, but, when it engages the segment having the distinctive potential, the magnet will not be energized, and the drive will be interrupted, leaving the indicator drum and type wheel set to the corresponding amount and the brush standing on the corresponding segment.

The related indicator drum, type wheel, and sensing brush will remain in their set positions until the next read-out operation, and this feature is used to enable the amount which was indicated and/or printed to be stored, to be used at any desired time prior to the next read-out operation. This storage is accomplished as follows. Each unit is provided with another commutator 110, which is similar to the commutator 105 and has ten segments and a collector ring but which is mounted on the inside of the wall 65. A brush similar to brush 108 is mounted on the other brush carrier 72 and will complete a circuit from the collector ring selectively to that one of the segments which corresponds to the setting of the indicator drum and type wheel. Accordingly, the amount standing on the indicator drum and type wheel can be made available to control some other apparatus or select an apparatus merely by completing a circuit through the collector ring, brush, and the selected segment of the commutator to the apparatus to be controlled.

PRINTER PORTION

The various elements of the printer portion at the left of the mechanism are mounted between printer side frames 29 and 111 (Figs. 2A and 5) secured to a printer base plate 112, which is supported above the main base 32 of the mechanism by a pair of auxiliary side frames as 113.

Type wheels

A pair of type wheel supporting frames 114 (Figs. 2A and 6) are secured to the printer base plate 112 and support a shaft 115, on which the type wheels 21 rotate to move various type to printing positions. The type wheels 21 are maintained in proper spaced relation on the shaft by suitable spacing sleeves 116 (Fig. 6).

Also carried by the type wheel supporting frames 114 is an aliner 117. The aliner 117 is supported at the front ends of levers 118 pivoted on a shaft 119 extending between the type wheel supporting frames 114 and can be rocked by a linkage operated by cams 120 on a main shaft 121, to engage the type wheels during a printing operation to aline the type. In the normal, unoperated position of the aliner 117, it engages a switch 122 carried by a cross brace 123 and maintains the switch in its closed condition. This switch is in the circuit for controlling the setting of the indicator drums and type wheels and will prevent any change in the setting during a printing operation. The manner in which the switch 122 exerts its control will be explained more fully when the circuit diagram is considered.

Record material supporting and feeding means

Means are provided in the printing portion of the apparatus to support a supply of record material and guide the material relative to the type wheels and to feed the record material between printing operations to line-space the material.

The record material supporting and feeding means is similar to the corresponding means shown in the United States patent to Edward J. Carey and John B. Geers, No. 2,443,652, which issued on June 22, 1948, but differs therefrom in that the location of the record material supply and receiving rolls is reversed, the record material being fed in the reverse direction past the printing point, and further differs in the details of the feeding mechanism for providing uniform line-spacing of the material.

Figure 9:
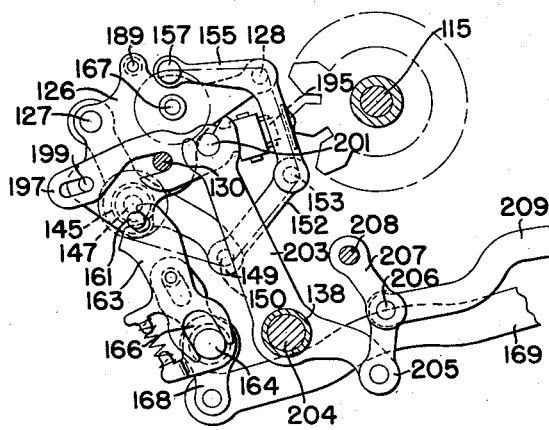
Fig. 9 is a detail view, showing the platen and the record material supporting means in printing position, just before the platen is operated.

The record material supporting and feeding means, which is best shown in Figs. 2A, 5, 6, 7, and 9, is mounted in a rockable framework having end plates 125 and 126, which are held in proper spaced relation by cross rods 127 and 128 and which can be rocked about pivots 129 and 130 to move the record material from its normal unoperated position, as shown in Fig. 6, to printing position, as shown in Fig. 9.

The pivots 129 and 130 are secured to a left plate 131 and a right plate 132, respectively, which are secured to a cross rod 133 and form a removable support for the rockable framework to enable the record material supporting and feeding means to readily be removed from and introduced into the machine.

Trunnions are formed on the ends of the cross rod 133. The trunnion at one end of the rod fits in a cylindrical bearing member 134 (Fig. 2A) secured to the inside of the left printer side frame 29, and the trunnion at the other end of the rod fits in a slot 135 in the right printer side frame 111. The arrangement is such that, by sliding the support slightly to the right (Fig. 2A), the trunnion will be moved from the bearing member 134, and this will then enable the support to be raised to move the other trunnion from the slot 135 and the support to be removed from the machine.

The left plate 131 and the right plate 132 are formed with rearwardly- and downwardly-extending legs 136 (Fig. 6), which have notches adapted to engage hubs 137 and 138 secured in axial alinement with each other in the printer side frames 29 and 111.

The rockable framework will be in operating position when the tenons on the cross rod 133 are in the bearing member 134 and the slot 135 and when the notches in the legs on the left plate 131 and the right plate 132 engage the hubs 137 and 138. Two similar latches 139 and 140, pivoted on the right plate 131 and the left plate 132, respectively, engage studs as 141 (Fig. 5) on the adjacent printer side frames 29 and 111 to retain the removable support in the machine.

A core 145 of the supply roll is mounted between a stud 146, carried by a lever 148, and a spring-pressed stud 147, carried by a lever 149, which levers are pivoted at their forward ends on the rod 127 adjacent the end plates 125 and 126. The rear ends of levers 148 and 149 are connected together by a rod 150, which is supported by the lower ends of links 151 and 152. The upper ends of the links 151 and 152 are pivoted on a rod 153, carried by the rearwardly-extending arms of bell cranks 154 and 155, which are pivoted on the rod 128 outside the end plates 125 and 126, respectively. The other arms of the bell cranks 154 and 155 have rollers 156 and 157, which work in corresponding cam slots, as 158, in the right and left plates 131 and 132, to cause the bell cranks to be rocked clockwise (Fig. 6) relative to the end plates 125 and 126 when the framework is rocked to printing position.

A core 165 of the receiving roll, upon which the record material is wound after printing, is mounted between a stud 159, rotatable on the left end plate 125, and a spring-pressed stud 167, which is rotatable on the right end plate 126. The spring-pressed stud on the right end plate 126 forms a part of the line-spacing mechanism and has thereon tenons which engage corresponding cut-out portions in the core 165 to effect a driving connection between the core and the stud thereby to enable line-space movement to be imparted to the receiving roll. The manner in which line-spacing is effected will be explained more fully hereinafter.

As shown clearly in Figs. 6 and 9, the record material extends from the core 145 of the supply roll over the rods 150, 153, and 128 to the core 165 of the receiving roll, on which it is wound as printing progresses.

The levers 148 and 149, the rod 150, the links 151 and 152, the rod 153, and the bell cranks 154 and 155 form a linkage which rocks with the framework and also relatively to the framework to place the record material in proper position relative to the type wheels when the framework is rocked to move the record material to printing position.

The means for rocking the framework will now be described.

Studs 160 and 161 (Figs. 6 and 9) on the end plates 125 and 126 of the rockable framework are adapted to enter notches in the upper ends of rocking levers 162 and 163 when the rockable framework is placed in operating position in the machine. The rocking levers 162 and 163 have their lower ends slotted to straddle a shaft 164, journaled in the printer side frames 29 and 111, and also carry studs which extend through corresponding slots in arms 166, which are secured to the shaft 164. A compression spring, as 167a (Fig. 6), compressed between extensions on a related lever and arm, urges the lever upward to maintain a notch in the upper end of the lever in engagement with the stud, as 160, on the end plate 125. When the shaft 164 is rocked from the position shown in Fig. 6 counter-clockwise to the position shown in Fig. 9, the rockable framework will be shifted from its normal position clockwise to printing position.

Figure 8:
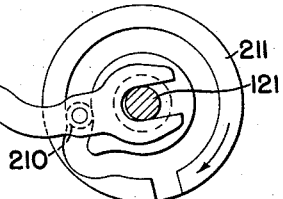
Fig. 8 shows the cam for moving the platen and the record material supporting means from normal position to printing position and shows the cam in the middle of its operation.

Secured to the left end of the shaft 164 (Figs. 2A and 9) is a crank 168 having pivoted thereto a pitman 169 (Figs. 2A, 8, and 9) carrying a roller 170 (Fig. 8) cooperating with a cam groove in a cam 171, which is secured to a main drive shaft 121. This cam groove 171, through the pitman and the crank, rocks the shaft 164 first counter-clockwise, from the position shown in Fig. 6 to the position shown in Fig. 9, and then clockwise back to the position shown in Fig. 6. The cam 171 is shown in its mid-cycle position in Fig. 8, in which position it has shifted the framework to printing position.

The record material feeding means is effective to line-space the record material a uniform distance each time the rockable framework moves to printing position.

Figure 7:
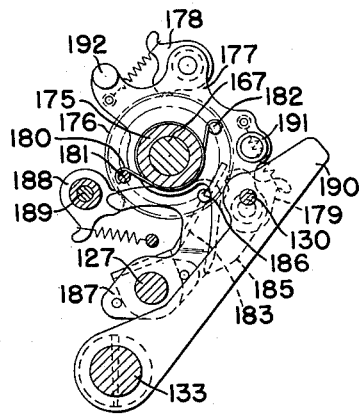
Fig. 7 is a detail of the record material feeding means for line-spacing the material.

The spring-pressed mounting stud 167, which engages the right end of the receiving core 165, is rotatable in hub 175 (Fig. 7), carried by the end plate 126, and has coupled thereto a ratchet 176 (Figs. 2A and 7). A feeding plate 177 is mounted on the stud 167 adjacent the ratchet 176 and carries a pair of driving pawls 178 and 179, which are spring-urged into engagement with the ratchet. The pawls 178 and 179 are so spaced on the plate 177 that, when the teeth on one pawl are in driving engagement with the teeth on the ratchet 176, the teeth on the other pawl are out of driving engagement by one half tooth space. Either pawl can be effective to drive the ratchet, depending on their relative positions. This displacement of the pawls by half a tooth space and use of either pawl to drive has the same effect as doubling the number of teeth on the ratchet and enables an extremely accurate feed to be obtained without requiring a large number of very small teeth on the ratchet and without requiring too close spacing of the teeth.

A spring 180, tensioned between a stud 181 on the end plate 126 and a stud 182 on the feeding plate 177, normally urges the feeding plate clockwise (Fig. 7) until an extension 185 on the feeding plate engages a stud 186 on a lever 187, which is pivoted on the rod 127. Lever 187 has secured thereto a feeler plate 183, which is spring-urged counter-clockwise about the rod 127 to engage the periphery of the receiving roll and thereby adjust the lever 187 to different positions, so that the stud 186 thereon can determine the different home positions of the plate 177 as the diameter of the roll increases. When the diameter of the roll is small, the stud 186 will engage the inner end of the surface on the extension 185 and will allow the plate 177 to return its maximum distance clockwise as the record material supporting framework returns to its normal position; but, as the roll increases in size, the stud 186 will be forced toward the outer end of the surface on the extension 185 and will gradually decrease the extent of clockwise movement which the plate 177 can make in the return movement of the framework. During the clockwise movement of the plate 177, the driving pawls pass idly over the ratchet 176, which is prevented from making a clockwise movement by a pair of pawls 188, which are pivoted on a stud 189 on the end plate 126. These pawls 188 have their teeth offset half the spacing of the ratchet teeth, so as to be able to retain the ratchet in operated position regardless of which of the pawls 178 or 179 was effective in driving the ratchet to this position.

The movement of the stud 186 outward along the surface of the extension 185 (Fig. 7), as the diameter of the receiving roll increases, compensates for the increasing diameter of the roll, so that the spacing will be uniform as the roll is line-spaced.

As the rockable framework is moved to printing position, an arm 190, secured to the cross rod 133, will engage a roller 191 on the feeding plate 177 and will rock the plate counter-clockwise to a predetermined point from any of the positions in which it was stopped by the stud 186 on the lever 187. During this counter-clockwise movement of the feeding plate 177, the driving pawls thereon will drive the ratchet counter-clockwise to rotate the receiving roll and line-space the record material.

A handle 192, carried by the plate 177, enables the plate to be rocked counter-clockwise (Fig. 7) to manually line-space the record material whenever such an operation is desired.

*Impression mechanism*

A printing platen 195 (Figs. 2A, 6, and 9) is carried by the rockable framework, so that, as the framework is rocked to move the record material into printing position relative to the type wheels, it will also move the platen opposite the printing point, as shown in Fig. 9.

A left supporting arm 196 and a right supporting arm 197 for the platen are mounted on the outside of the end plates 125 and 126. The supporting arms are slotted to fit over the pivots 129 and 130, about which the framework rocks, and are also slotted to engage studs 198 and 199 on the end plates. This connection enables the platen 195 to be rocked with the framework and to also be capable of being operated relatively to the framework to make an impression.

The supporting arms 196 and 197 have studs 200 and 201 thereon, which are moved into notches in the upper end of plate-operating levers 202 and 203 when the framework is moved to printing position, as shown in Fig. 9.

The platen-operating levers 202 and 203 are secured to a shaft 204, which is journaled in the hubs 137 and 138, and will force the platen rearwardly into engagement with the usual ink ribbon to take an impression from the type when the shaft is rocked clockwise (Fig. 9). An extension on the lever 203 is pivotally connected to the lower end of a toggle link 205. The upper end of the link 205 is pivotally connected by a stud 206 to a companion toggle link 207 pivotally mounted on a stationary stud 208 in the right printer side frame 111. The stud 206 also pivotally supports the forward end of an operating pitman 209, the rear end of which is bifurcated to straddle the main shaft 121 and carries a roller 210, which cooperates with a camming groove in a cam 211 secured to the main shaft 121. The cam 211 is shown in mid-cycle position in Fig. 9. The camming groove of cam 211 cooperates with the roller 210 to shift the pitman 209 to the left (Fig. 9) to straighten the toggle and thereby rock the shaft 204 and the arms clockwise to cause the platen 195 to be carried rearwardly to cause an impression to be made on the record material. After the impression has been made, the pitman 209 is shifted to the right (Fig. 9) to restore the platen to its starting position prior to the rocking of the framework to normal position.

Operating mechanism for the printer portion

After the indicator drums and type wheels have been set, the operating mechanism for the printer portion of the apparatus is automatically called into operation to cause the record material to be line-spaced and the data to be printed thereon.

A conventional motor 215 (Fig. 2A) drives the main shaft 121 (Figs. 2A, 3, 5, 6, 8, and 9) one revolution clockwise for each operation of the printer. The motor 215 is secured to the base 112 and has an armature shaft 216 (Fig. 5), to which is secured a pinion 217, which meshes with a gear 218 free on a stud 219 on the printer side frame 111. The gear 218 has a four-toothed ratchet 220 integral therewith. The teeth of this ratchet are in cooperative relation with a shoulder on a spring-urged clutch pawl 221 pivotally mounted on a stud on a clutch disk 222 free on the stud 219. The disk 222 is connected to a gear 223, which is also free on the stud 219. The gear 223 meshes with a gear 224 secured to the main shaft 121.

Before an operation of the printer portion is initiated to make an impression on the record material, a surface on the pawl 221 is engaged by the upper end of a clutch control arm 230 free on a stud 231 in the side frame 111, to retain the pawl 221 in its clockwise or disengaged position against the action of a spring 232. The disengaged position of the pawl 221 is also determined by the engagement of the pawl with a stud 233 on the clutch disk 222.

The arm 230 is fixedly connected, by a stud 234, to a clutch control lever 235 free on the stud 231. The lever 235 is urged counter-clockwise by a spring 236 to normally maintain a surface 237 on an upward extension of the lever 235 in engagement with a bent-over ear 238 on a motor release bar 239. The bar 239 is slidably mounted on the side frame 111 by means of slots in the bar which cooperate with studs on the frame, and is normally maintained in its upward position by a spring 240.

A tripping solenoid 241, mounted on a bracket which is secured to the side frame 111, has its armature connected to the bar 239 and, when energized, will draw the bar 239 downwardly to initiate a printing operation. The circumstances under which the solenoid 241 will be energized to operate the bar 239 will be explained later when the circuit diagram is considered.

Pivotally mounted on the upward extension of the lever 235 is a non-repeat pawl 242, urged clockwise by a spring into the path of a square stud 243 secured to the frame 111. A stud carried by the pawl 242 engages the rear edge of the lever 235 to limit the clockwise movement of the pawl under the influence of the spring. When the surface 237 on the upper extension of the lever 235 engages the bent-over ear 238 on the release bar 239, the end of the non-repeat pawl 242 will be retained a slight distance from the stud 243.

Downward movement of the release bar 239 causes the ear 238 to move beneath the surface 237 and into alinement with a clearance portion of the lever 235, and also causes said ear to engage and rock the non-repeat pawl 242 out of engaging relation with the stud 243. This frees the lever 235 to the action of the spring 236, which immediately rocks said lever and arm 230 counter-clockwise to disengage the upper end of said arm from the pawl 221. When the bar 239 is depressed, the ear 238 thereon will move below the hook-shaped upper end of the lever 235, which will pass thereover and retain the bar 239 in depressed position. The disengagement of the arm 230 from the pawl 221 releases the pawl to the action of its spring 232, which moves the pawl into engagement with the ratchet to couple the motor 215 to the main shaft 121.

Simultaneously with the movement of lever 235 to cause the arm 230 to be disengaged from the pawl 221, a block of insulating material 244, secured to a forward arm 245 of the lever 235, closes the contacts of a motor switch 250 to complete an operating circuit to the motor 215 to cause it to drive the shaft 216 and, through the clutch and related gears, the main shaft 121. As the main shaft 121 nears the end of one revolution, a roller 251, carried by its driving gear 224, engages a camming surface 252 on the upward extension of the lever 235 to rock said lever and the arm 230 clockwise against the action of the spring 236 to open the switch 250 and to move the upper end of the arm 230 into the path of the pawl 221. Continued movement of the clutch disk 222 causes the pawl to engage the upper end of the arm 230 and be disengaged from the ratchet 220 to uncouple the clutch and disconnect the main shaft 121 from the motor, thereby to terminate clockwise movement of the main shaft after the shaft has made one revolution.

Clockwise restoring movement of lever 235 moves the hook-shaped upper end of the lever from over the ear 238 to allow the bar to be restored and moves the non-repeat pawl 242 well beyond the stud 243 and the ear 238, so that the spring can restore the pawl 242 into engaging relation with the ear 238 or the stud 243 to retain the lever in its restored position when the roller 51 moves beyond the camming surface 252 on the lever. In case the bar remains depressed at the end of a printing operation, the non-repeat pawl 242 can engage behind the ear 238 on the depressed bar to retain the lever in its restored position; then, when the bar returns to its upper position, the ear 238 will move from in front of the pawl 242 and in front of the surface 237 on the upper extension of the lever 235 and will retain the lever in its restored position.

When the release bar 239 is operated to its fullest extent, it will close a switch 255, which is mounted on the side frame 111. This switch is in a circuit of a relay which will operate to cause the circuit of the solenoid 241 to open, thereby deenergizing the solenoid and allowing the bar to return to its unoperated condition when the lever 235 is restored near the end of the cycle of operation of the printer. The details of this circuit will be set forth more clearly when the circuit diagram is explained.

Control and operating circuits

Figure 10A:
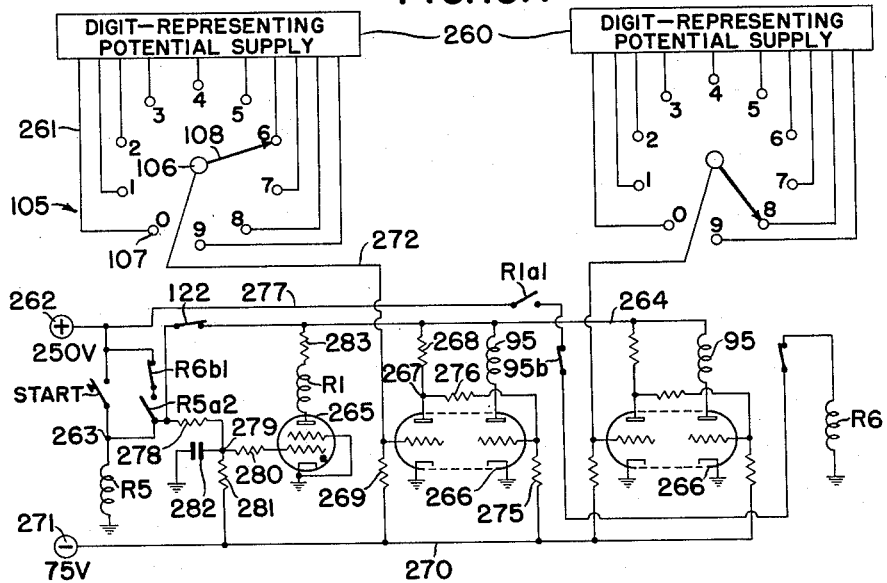
Figs. 10A and 10B show circuit diagrams for controlling and interrelating the operation of the various parts of the indicating and printing mechanism.
Figure 10B:
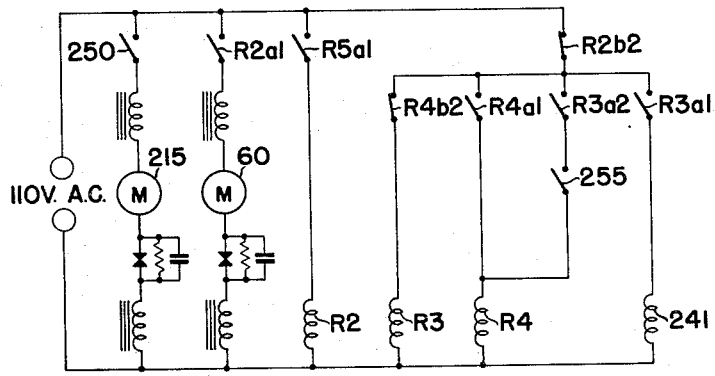

The various control and operating circuits are shown in Figs. 10A and 10B, Fig. 10A showing the direct-current portion of the circuits and Fig. 10B showing the alternating-current portion of the circuits. In the circuits of Fig. 10A, the control circuits for only two units, as 50, for setting the related indicator drums and type wheels, are shown, because these control circuits are the same for all units, and their coordination and control over the setting will be clear from the controls for the two units which are shown.

When the alternating current is first applied to the circuit of Fig. 10B, a printing operation takes place as an incident to conditioning the control circuits. This conditioning insures that a further printing operation will not take place except after an indicator-drum-and-type-wheel-setting operation has been completed. Upon initial application of current to the circuit, relay R3 will be energized over normally-closed contacts R2b2 and R4b2 and will close contacts R3a1 to energize solenoid 241, which operates release bar 239 to release lever 235, which in turn closes the motor switch 250 and starts a printing operation, as previously described.

Relay R3, when energized, also closes contact R3a2. Then, when the release bar 239 has completely operated and closes contact 255, an energizing circuit is completed for relay R4 over normally-closed contact R2b2 and contacts R3a2 and 255.

Relay R4, upon being energized, opens normally-closed contact R4b2 to deenergize relay R3, which in turn opens contact R3a1 to deenergize the solenoid 241.

Relay R4 also closes a holding circuit for itself over contacts R2b2 and R4a1 and will remain energized until relay R2 is energized in a read-out or indicator-drum-and-type-wheel-setting operation. As long as relay R4 is energized, relay R3 will remain deenergized, and this will prevent the energization of solenoid 241 to initiate a further printing operation.

As explained earlier herein, the amounts to be indicated and/or printed are represented by distinctive potentials, the one corresponding to the digit to be indicated on any drum being more positive than others of a plurality of related potentials. The source of digit-representing potentials, which is used to control the setting of an indicator drum and related type wheel, is shown diagrammatically at 260 in Fig. 10A, two such sources being shown in this figure. Each source is capable of supplying potentials to conductors 261 corresponding to the various digits, that conductor corresponding to the digit to be indicated and/or printed being supplied with a more positive potential than the others of the group. The conductors 261 extend over plug connections, shown at 109 in Fig. 3, but not shown in Fig. 10A, to corresponding segments 107 of the commutator 105 of its related setting unit 50.

After the potentials in the sources of digit-representing potentials have been stabilized and represent an amount which is to be indicated and/or printed, a "Start" key (Fig. 10A) is operated to close a circuit to energize relay R5 and also to apply operating potential to electron discharge tubes in the control circuits for the various units. This circuit extends from +250-volt terminal 262 over "Start" key, point 263, and relay R5 to ground, and from point 263 over normally closed switch 132 to anode potential supply conductor 264 for the delay tube 265 and the control tubes as 266 (see also Fig. 3) for the several units. Switch 122, which is normally closed, will be opened when the aliner 117 has been moved from its normal position into engagement with the type wheels during the period in which an impression is being taken therefrom. The opening of this switch will remove anode potential from the setting controls, thereby preventing any type wheel and indicator drum setting operation from taking place at this time. While a manually-operable "Start" key is shown for initiating an operation of the apparatus, it is to be understood that this is only for convenience in this disclosure because, when the apparatus is used with some other computing or analyzing mechanism, the switch may be momentarily closed by a relay or other part of the mechanism automatically in a cycle of operation to cause the indication and/or printing to be properly related with the operation of the mechanism.

Relay R5 is energized and closes contact R5a2 to provide a holding circuit for itself from terminal 262 over normally-closed contact R6b1 and contact R5a2 and point 263. This circuit maintains relay R5 energized and also continues to supply anode potential to the conductor 264 until the read-out operation has been completed and the indicator drums and type wheels have been set.

Relay R5 also closes contact R5a1 (Fig. 10B), which completes the energizing circuit to relay R2, which in turn closes contact R2a1 to complete the circuit to the motor 60, causing this motor to operate and provide the drive for setting the indicator drums and type wheels.

Energization of relay R2 also opens contact R2b2, which causes relay R4 to become deenergized. Deenergization of relay R4 allows contacts R4b2 in the circuit to relay R3 to reclose, but the circuit to this relay is opened at contacts R2b2, and relay R3 will not be energized. Relay R2 remains energized until the read-out or setting operation has been completed and thereby prevents the energization of the solenoid 241 to initiate a printing operation during the read-out operation.

With the circuit completed to the indicator drive motor 60, the shaft 54 (Fig. 3) will be driven thereby to set the indicator drums and type wheels.

Those brushes 108 which are on contacts which do not have the distinctive potential applied thereto will control their related setting control circuits to cause the indicator drum and related type wheel to be positioned. One of the setting control circuits will now be described, and, since the setting circuits for the various drums and type wheels are the same, their operation will be clear from the description of this one.

Each setting control circuit includes a twin triode electron tube 266 (Figs. 3 and 10A), of the type sold by Radio Corporation of America as 6J6. The left triode of tube 266 serves as a phase inverter and has its anode connected over point 267 and resistor 268, of 100,000 ohms, to the anode potential supply conductor 264 and has its cathode connected directly to ground. The control grid of this triode is connected over a resistor 269, of 1 megohm, to a bias supply conductor 270, which has a potential of —75 volts applied thereto at terminal 271. This control grid is also connected over conductor 272 to the collector ring 106 of the commutator, so that, as the brush 108 is driven past the contacts 107 in succession, the potentials which have been applied to these contacts will be impressed on the grid. The bias supplied to this triode is such that it will be normally-non-conducting but will conduct when the brush engages the contact having the most positive potential applied thereto.

The right triode of tube 266 has its anode connected over the clutch solenoid 95 to the anode potential supply conductor 264 and has its cathode connected directly to ground. The grid of this triode is connected over resistor 275, of 470,000 ohms, to the bias supply conductor 270, and is also connected over resistor 276, of 470,000 ohms, to point 267 in the anode circuit of the left triode. Whenever the left triode is non-conducting, the potential on the grid of the right triode will permit conduction in the right triode, and conduction in the right triode will cause the clutch solenoid 95 to be energized to trip the clutch and connect the drive to the indicator drum and type wheel and to the sensing means to cause these to be driven. The brush in the sensing means, together with the drum and type wheel, will be driven through repeated cycling of the clutch until the brush 108 engages the contact 107 having the distinctive potential, at which time the left triode of tube 266 will begin to conduct and cause the right triode to cease conducting, thereby deenergizing the clutch solenoid 95 and allowing the clutch trip lever 87 (Fig. 4) to return to clutch-uncoupling position to uncouple the drive, with the indicator drum and type wheel in proper digit-indicating and -printing positions.

Each of the setting control circuits for the other units cooperates as described above to cause the related indicator drums and type wheels to be set according to the distinctive potentials applied thereto.

The above setting control circuit is used when the digit to be indicated and/or printed is represented by the most positive potential of the related group of potentials.

If the apparatus is to be used to indicate digits which are represented by the most negative potential of a related group of potentials, then the left triodes of the control tubes will not be used, and the control grids of the right triodes will be connected to the slip rings 106 instead of being connected to the points, as 267, in the anode circuits of the left triodes. In this case, the right triode of tube 266 will conduct until the brush engages the segment having the most negative potential, which potential will be capable of causing the triode to cease conducting and the clutch magnet 95 to become deenergized.

As explained earlier herein, each clutch solenoid 95, while energized, opens a normally-closed contact 95b, and the contacts 95b are included in a circuit for signalling when the setting operation has been completed. The circuit extends from terminal 262 over conductor 277, switch R1a1, in series over the switches 95b for the several units and over the winding of relay R6 to ground. Switch R1a1 in this circuit is normally open but is automatically closed after a short delay following the closing of the "Start" key. When the "Start" key is closed, the +250 volts from terminal 262 is applied from point 263 over resistor 278, of 1 megohm, to point 279 in the control grid circuit of the delay tube 265, which point 279 is connected to the control grid over a resistor 280, of 470,000 ohms, and is connected over resistor 281, of 750,000 ohms, to the negative potential conductor 270 and over capacitor 282, of .1 microfarad, to ground. The delay tube 265 is a gaseous tetrode of the type sold by General Electric Company under the designation GL5663. This tube has its anode connected over the winding of relay R1 and resistor 283, of 20,000 ohms, to the anode potential supply conductor 264 and has its cathode and shield grid connected directly to ground.

The control grid of the delay tube 265 is normally negatively biased and, due to capacitor 282, will momentarily prevent conduction from occurring in the tube when positive potential is applied to the grid and anode potential is supplied to the tube by the operation of the "Start" key.

When conduction takes place in the delay tube 265, relay R1 will be energized and will close contact R1a1 in the circuit to relay R6 to enable relay R6 to be energized when all the control solenoids 95 have been deenergized in the setting of the drums and type wheels. The delay in closing contact R1a1 insures that any control solenoids 95 which are to be energized to cause a setting of their related drums and type wheels will be energized to open their contacts 95b before the control over the relay R6 can become effective, and thus insures that the proper setting will take place.

Relay R6, when energized at the end of a readout or setting operation, opens contact R6b1 (Fig. 10A) in the holding circuit to relay R5 ("Start" key, which is momentarily depressed, is open at this time) and releases relay R5 and also removes anode potential from the tubes in the setting control circuit to prevent a further setting operation.

The release of relay R5 opens contact R5a1 in the circuit to relay R2 to deenergize this relay.

Relay R2, when deenergized, recloses contacts R2b2, which causes relay R3 to be energized.

As explained earlier herein, the energization of relay R3 causes the trip solenoid 241 to be energized to initiate a printing operation, during which the relay R4 is energized to release relay R3 and to maintain relay R3 deenergized until relay R2 is energized in another indicator-drum setting operation.

The control circuits accordingly control the setting of the indicator drums and type wheels, as required by the distinctive potentials supplied thereto, and also interrelate the setting operation and the printing operation, so that a setting operation cannot take place during a printing operation and a printing operation cannot take place during a setting operation.

The relays R1 to R6, and delay tube 265, which are shown in the circuit diagrams of Figs. 10A and 10B, are mounted on a suitable panel 290 between the auxiliary side frames 113, as shown in Fig. 5.

The tubes 266 in the various setting circuits are mounted on the supporting plate 51, just below their related units 50, as shown in Fig. 3.

Since the novel indicating and printing apparatus is intended to be capable of use with various sources of digit-representing potentials and as an element of other more complex apparatus, provision is made for additional controls that may be necessary, by having accommodations on a shelf 291, mounted on the front of plate 51, for additional control tubes, as shown in Figs. 2B and 3.

While the device shown herein is admirably adapted to fulfill the objects primarily stated, it is to be understood that it is not intended to confine the invention to the one form or embodiment disclosed herein, for it is susceptible of embodiment in various other forms.

What is claimed is:

1. In a printing apparatus for printing data which is represented by distinctive potentials, the combination of a plurality of type carriers, each having a plurality of characters thereon and settable to a corresponding plurality of positions to present the various characters in printing position, one after another in succession; a plurality of groups of contacts, one group for each type carrier and each group containing a contact for each character on the carrier; means to supply potentials to the contacts, with the contact in each group which corresponds to the character to be printed having a potential applied thereto which is distinctive from the potential applied to the other contacts of the group; sensing means related to the type carriers and operable in synchronism with the setting of their related type carriers for sensing the contacts one after another in succession, for those contacts with the distinctive potential; driving means for the type carriers and sensing means including a motor and an electromagnetically-controlled cyclically-operable clutch for each related type carrier and sensing means, each cycle of operation of a clutch causing its related type carrier to be set to present the next character in printing position and causing the sensing means to sense the next contact; potential-sensitive means controlled by the sensing means for controlling the electromagnetically-controlled clutches to cause a clutch to make a cycle of operation each time the sensing means senses a contact that does not have the distinctive potential; means to initiate an operation of the driving means and to render the potential-sensitive means effective to control the clutches to cause a data-sensing and type-carrier-setting operation to take place; means to take an impression from the set type carriers; cyclically-operable means to operate the impression means; tripping means to initiate a cycle of the impression means operating means; means operated by the initiating means for preventing an operation of the tripping means during a data-sensing and type-carrier-setting operation; means controlled by the control means for all the clutches for rendering the preventing means ineffective and for causing an operation of the tripping means upon a completion of a type-carrier-setting operation; and means operated by the impression means operating means and effective upon the initiation of the operation of this means, for disabling the control of the electromagnetically-operated clutches during the cycle of operation of the operating means, to prevent any setting movement of the carriers during the taking of an impression therefrom.

2. In a printing apparatus for printing data which is represented by distinctive potentials, the combination of a plurality of type carriers, each having a plurality of characters thereon and settable to a corresponding plurality of positions to present the various characters in printing position, one after another in succession; a plurality of groups of contacts, one group for each type carrier and each group containing a contact for each character on the carrier; means to supply potentials to the contacts, with the contact in each group which corresponds to the character to be printed having a potential applied thereto which is distinctive from the potential applied to the other contacts of the group; sensing means related to the type carriers and operable in synchronism with the setting of their related type carriers for sensing the contacts one after another in succession, for those contacts with the distinctive potential; driving means for the type carriers and sensing means including a motor and an electromagnetically-controlled cyclically-operable clutch for each related type carrier and sensing means, each cycle of operation of a clutch causing its related type carrier to be set to present the next character in printing position and causing the sensing means to sense the next contact; potential-sensitive means controlled by the sensing means for controlling the electromagnetically-controlled clutches to cause a clutch to make a cycle of operation each time the sensing means senses a contact that does not have the distinctive potential; means to take an impression from the type carriers; and means jointly controlled by the electromagnets which control the clutches for automatically causing an operation of the impression means when all the clutches have finished cycling, whereby to cause the printing of the set data.

3. In a printing apparatus for printing data which is represented by distinctive potentials, the combination of a plurality of type carriers, each having a plurality of characters thereon and settable to a corresponding plurality of positions to present the various characters in printing position, one after another in succession; a plurality of groups of contacts, one group for each type carrier and each group containing a contact for each character on the carrier; means to supply potentials to the contacts, with the contact in each group which corresponds to the character to be printed having a potential applied thereto which is distinctive from the potential applied to the other contacts of the group; sensing means related to the type carriers and operable in synchronism with the setting of their related type carriers for sensing the contacts one after another in succession, for those contacts with the distinctive potential; driving means for the type carriers and sensing means including a motor and an electrically-controlled cyclically-operable clutch for each related type carrier and sensing means, each cycle of operation of a clutch causing its related type carrier to be set to present the next character in printing position and causing the sensing means to sense the next contact; potential-sensitive means controlled by the sensing means for controlling the electromagnetically-controlled clutches for causing a clutch to make a cycle of operation each time the sensing means senses a contact that does not have the distinctive potential; means to take an impression from the type carriers; means to operate the impression means; means to initiate an operation of the impression means operating means; and means operable by the impression means operating means and effective upon an initiation of an operation of the impression means, for disabling the potential-sensitive means which controls the electromagnetically-controlled clutches to prevent a further setting of the type carriers during a taking of an impression therefrom.

4. In a printing apparatus for printing data which is represented by distinctive potentials, the combination of a plurality of type carriers, each having a plurality of characters thereon and settable to a corresponding plurality of positions to present the various characters in printing position, one after another in succession; a plurality of groups of contacts, one group for each type carrier and each group containing a contact for each character on the carrier; means to supply potentials to the contacts, with the contact in each group which corresponds to the character to be printed having a potential applied thereto which is distinctive from the potential applied to the other contacts of the group; sensing means related to the type carriers and operable in synchronism with the setting of their related type carriers for sensing the contacts one after another in succession, for those contacts with the distinctive potential; driving means for the type carriers and sensing means including a motor and an electromagnetically-controlled cyclically-operable clutch for each related type carrier and sensing means, each cycle of operation of a clutch causing its related type carrier to be set to present the next character in printing position and causing the sensing means to sense the next contact; potential-sensitive means controlled by the sensing means for controlling the electromagnetically-controlled clutches to cause a clutch to make a cycle of operation each time the sensing means senses a contact that does not have the distinctive potential; means to initiate an operation of the driving means and to render the potential-sensitive means effective to control the clutches to cause a data-sensing and type-carrier-setting operation to take place; means to take an impression from the type carriers; and means jointly controlled by the control means for all the clutches to cause the impression means to operate when all the clutches have finished cycling, whereby to cause the printing of data which has been set up.

5. In a printing apparatus for printing data which is represented by distinctive potentials, the combination of a plurality of type carriers, each having a plurality of characters thereon and settable to a corresponding plurality of positions to present the various characters in printing position, one after another in succession; a plurality of groups of contacts, one group for each type carrier and each group containing a contact for each character on the carrier; means to supply potentials to the contacts, with the contact in each group which corresponds to the character to be printed having a potential applied thereto which is distinctive from the potential applied to the other contacts of the group; sensing means related to the type carriers and operable in synchronism with the setting of their related type carriers for sensing the contacts, one after another in succession, for those contacts with the distinctive potential; driving means for the type carriers and sensing means including a motor and an electromagnetically-controlled cyclically-operable clutch for each related type carrier and sensing means, each cycle of operation of a clutch causing its related type carrier to be set to present the next character in printing position and causing the sensing means to sense the next contact; potential-sensitive means controlled by the sensing means for controlling the electromagnetically-controlled clutches to cause a clutch to make a cycle of operation each time the sensing means senses a contact that does not have the distinctive potential; means to take an impression from the type carriers; means to operate the impression means; means to initiate an operation of the impression means; and means jointly controlled by the electromagnets which control the plurality of clutches to prevent the operation of the initiating means while any of the clutches is cycling.

6. In a printing apparatus for printing data which is represented by distinctive potentials, the combination of a plurality of type wheels, each having a plurality of characters about its periphery and rotatable to a corresponding plurality of positions to present the various characters in printing position, one after another in succession; a plurality of groups of contacts, one group for each type wheel and each group containing a contact for each character on the wheel; means to supply potentials to the contacts, with the contact in each group which corresponds to the character to be printed having a potential applied thereto which is distinctive from the potential applied to the other contacts of the group; sensing means related to the type wheels and including a brush for each set of contacts, each brush rotatable in synchronism with its related type wheel for sensing the contacts one after another in succession, for those contacts with the distinctive potential; driving means for the type wheels and the brushes of sensing means including a motor and an electromagnetically-controlled cyclically-operable clutch for each related type wheel and brush, each cycle of operation of a clutch causing its related type wheel to be rotated to present the next character in printing position and causing the brush to sense the next contact; potential-sensitive means controlled by the brushes in the sensing means as they sense the contacts for controlling the electromagnetically-controlled clutches to cause a clutch to make a cycle of operation each time the brush senses a contact that does not have the distinctive potential; read-out operation initiating means for causing the driving means to be operative and the potential-sensitive means to be effective to cause a read-out operation to take place to set the type wheels according to the distinctive potentials; means to take an impression from the type wheels which have been set; cyclically-operable impression means operating means; means to initiate a cycle of operation of the impression means operating means; a solenoid for operating the initiating means; means to energize the solenoid to initiate a cycle of operation of the impression means operating means; means controlled by the electromagnets which control the clutches for delaying the energization of the solenoid until the type wheels have been set; and means operated by the impression means operating means for disabling the potential-sensitive means during an operation of the impression means to prevent any change in setting of the type wheels while an impression is being taken therefrom.

7. In a printing apparatus for printing data which is represented by distinctive potentials, the combination of a plurality of type wheels, each having a plurality of characters about its periphery and rotatable to a corresponding plurality of positions to present the various characters in printing position, one after another in succession; a plurality of groups of contacts, one group for each type wheel and each group containing a contact for each character on the wheel; means to supply potentials to the contacts, with the contact in each group which corresponds to the character to be printed having a potential applied thereto which is distinctive from the potential applied to the other contacts of the group; sensing means related to the type wheels and including a brush for each set of contacts, each brush rotatable in synchronism with its related type wheel for sensing the contacts one after another in succession, for those contacts with the distinctive potential; driving means for driving the type wheels and the brushes of sensing means in a read-out operation, including a motor and an electromagnetically-controlled cyclically-operable clutch for connecting each related type wheel and brush to the motor, each cycle of operation of a clutch causing its related type wheel to be rotated to present the next character in printing position and causing the brush to sense the next contact; potential-sensitive means controlled by the brushes in the sensing means as they sense the contacts for controlling the electromagnetically-controlled clutches to cause a clutch to make a cycle of operation each time the brush senses a contact that does not have the distinctive potential; means to cause the driving means to be operative and the potential-sensitive means to be effective to cause a read-out operation to take place to set the type wheels according to the distinctive potentials; means to take an impression from the type wheels which have been set; cyclically-operable impression means operating means; trip means to initiate a cycle of operation of the impression means operating means; a solenoid for operating the trip means; means controlled by the electromagnets which control the clutches, for energizing the solenoid when all the type wheels have been set, whereby automatically to initiate a printing operation as soon as the type wheels have been set; and control means controlled by the means for causing a read-out operation and by the solenoid, for preventing a further operation of the solenoid until a further read-out operation has taken place.

8. In an apparatus for printing and indicating data which is presented thereto in the form of distinctive potentials, the combination of a plurality of type wheels, each wheel having characters, one after another in printing position; a corresponding plurality of indicator drums, each drum having about its periphery readily-readable characters corresponding to those on the type wheels and rotatable to bring the characters to a reading point; said indicator drums being of greater width than the type wheels; gearing interconnecting the type wheels and the drums so that a corresponding type wheel and drum will operate together to place the same characters in printing and reading position, said gearing enabling the type wheels and drums of different widths to be located in proper side-spaced relation; positive driving means for driving the type wheels and indicator drums in a read-out operation, including a cyclically-operated clutch for each related type wheel and indicator drum, each cycle of operation of the clutch advancing the type wheel and drum to move the next character on their peripheries to printing and reading positions; a plurality of groups of contacts, each group being related to one of the type-wheel-indicator drum pairs and including a contact for each character; means to supply data-representing potentials to the contacts with the contact in each group which corresponds to the character to be indicated and printed having a potential applied thereto which is distinctive from the potential applied to the other contacts of the group; sensing means for the several groups of contacts, said sensing means being driven from their respective clutches and moved from one contact to the next for each cycle of operation of the clutch; potential-sensitive means controlled by the sensing means to energize the clutch-control electromagnet to cause the related clutch to cycle each time a sensing means senses a contact which does not have the distinctive potential applied thereto whereby to cause the type wheels and indicator drums to be set in a read-out operation according to data represented by the distinctive potentials; means to initiate a read-out operation; impression means for making a record or record material from the set type wheels; means to guide record material past the impression means; means to feed the record material a uniform distance between each impression; driving means to operate the impression means and record material feeding means in a printing operation; and means controlled by the clutch-control electromagnets for initiating the operation of the driving means for the impression means and feeding means to cause a printing operation to take place as soon as all the type wheels and indicating drums have been set according to data to be printed.

9. In a printing apparatus for printing data which is represented by distinctive potentials, the combination of a plurality of type wheels, each having a plurality of characters about its periphery and rotatable to a corresponding plurality of positions to present the various characters in printing position, one after another in succession; a plurality of groups of contacts, one group for each type wheel and each group containing a potential contact for each character on the wheel; means to supply potentials to the contacts, with the contact in each group which corresponds to the character to be printed having a potential applied thereto which is distinctive from the potential applied to the other contacts of the group; sensing means related to the type wheels and including a brush for each set of contacts, each brush rotatable in synchronism with its related type wheel for sensing the contacts one after another in succession, for those contacts with the distinctive potential; driving means for the type wheels and the brushes of sensing means including a motor and an electromagnetically - controlled cyclically - operable clutch for each related type wheel and brush, each cycle of operation of a clutch causing its related type wheel to be rotated to present the next character in printing position and causing the brush to sense the next contact; potential-sensitive means controlled by the brushes in the sensing means as they sense the contacts for controlling the electromagnetically-controlled clutches to cause a clutch to make a cycle of operation each time the brush senses a contact that does not have the distinctive potential; means to take an impression from the type wheels which have been set; cyclically-operable impression means operating means; means to initiate a cycle of operation of the impression means operating means; a solenoid for operating the initiating means; and means operated by the initiating means upon a complete operation thereof by the solenoid for causing the circuit to the solenoid to be interrupted and thereby to prevent more than one impression from being taken.

References Cited in the file of this patent

UNITED STATES PATENTS

| Number | Name | Date |
| --- | --- | --- |
| 2,111,120 | Mills | Mar. 15, 1938 |
| 2,404,739 | Mumma | July 23, 1946 |
| 2,569,830 | Rabenda | Oct. 2, 1951 |